United States Patent

Horn et al.

Patent Number: 5,558,691
Date of Patent: Sep. 24, 1996

[54] CULLET FEEDER

[75] Inventors: Larry L. Horn, Galena; Barry R. James, Apple River; William L. Merkle, Elizabeth, all of Ill.; William R. Materna, Dubuque, Iowa; Stephen J. Coates, Galena, Ill.

[73] Assignee: Merkle Engineers, Inc., Galena, Ill.

[21] Appl. No.: 305,030

[22] Filed: Sep. 13, 1994

[51] Int. Cl.⁶ .................................................. C03B 3/00
[52] U.S. Cl. .............................. 65/335; 65/146; 414/156; 414/161; 414/165
[58] Field of Search ...................... 65/146, 335; 414/150, 414/156, 161, 165, 166

[56] References Cited

U.S. PATENT DOCUMENTS

| | | | |
|---|---|---|---|
| 1,917,247 | 7/1933 | Good | 414/166 |
| 1,953,221 | 4/1934 | Good | 414/166 |
| 3,476,538 | 11/1969 | Trethewey | 65/335 X |
| 3,780,889 | 12/1973 | Frazier et al. | 214/33 |
| 3,929,445 | 12/1975 | Zippe | 65/335 |
| 4,047,920 | 9/1977 | Armstrong | 65/335 |
| 4,197,109 | 4/1980 | Frazier et al. | 65/335 |
| 4,226,564 | 10/1980 | Takahashi et al. | 414/166 |
| 4,264,351 | 4/1981 | Pieper | 65/335 |
| 4,285,713 | 8/1981 | Wilkuski | 65/27 |
| 4,545,717 | 10/1985 | Wittler et al. | 414/166 |
| 4,854,959 | 8/1989 | Waltert | 65/335 |
| 4,954,034 | 9/1990 | Nelson et al. | 414/156 |
| 4,983,206 | 1/1991 | Trunzo | 65/335 |
| 5,073,183 | 12/1991 | Hammond et al. | 65/335 |
| 5,123,942 | 6/1992 | Argent et al. | 65/27 |
| 5,134,627 | 7/1992 | Crouse | 373/33 |
| 5,158,412 | 10/1992 | Merkle | 414/166 |

Primary Examiner—Donald E. Czaja
Assistant Examiner—Sean Vincent
Attorney, Agent, or Firm—Speckman, Pauley & Fejer

[57] ABSTRACT

An adjustable vibrating plate cullet feeder for feeding recycle glass to melting furnaces. Independent control of the rate of cullet feed is obtained by adjustment of at least one of: the angle of the feeder plate, the intensity of the vibration, and the frequency of the vibration. The vibrating plate cullet feeder may be positioned to feed over a batch charger or may feed directly into the melting furnace and may be controlled by the batch charger or independently by a furnace level or composition controller.

16 Claims, 2 Drawing Sheets

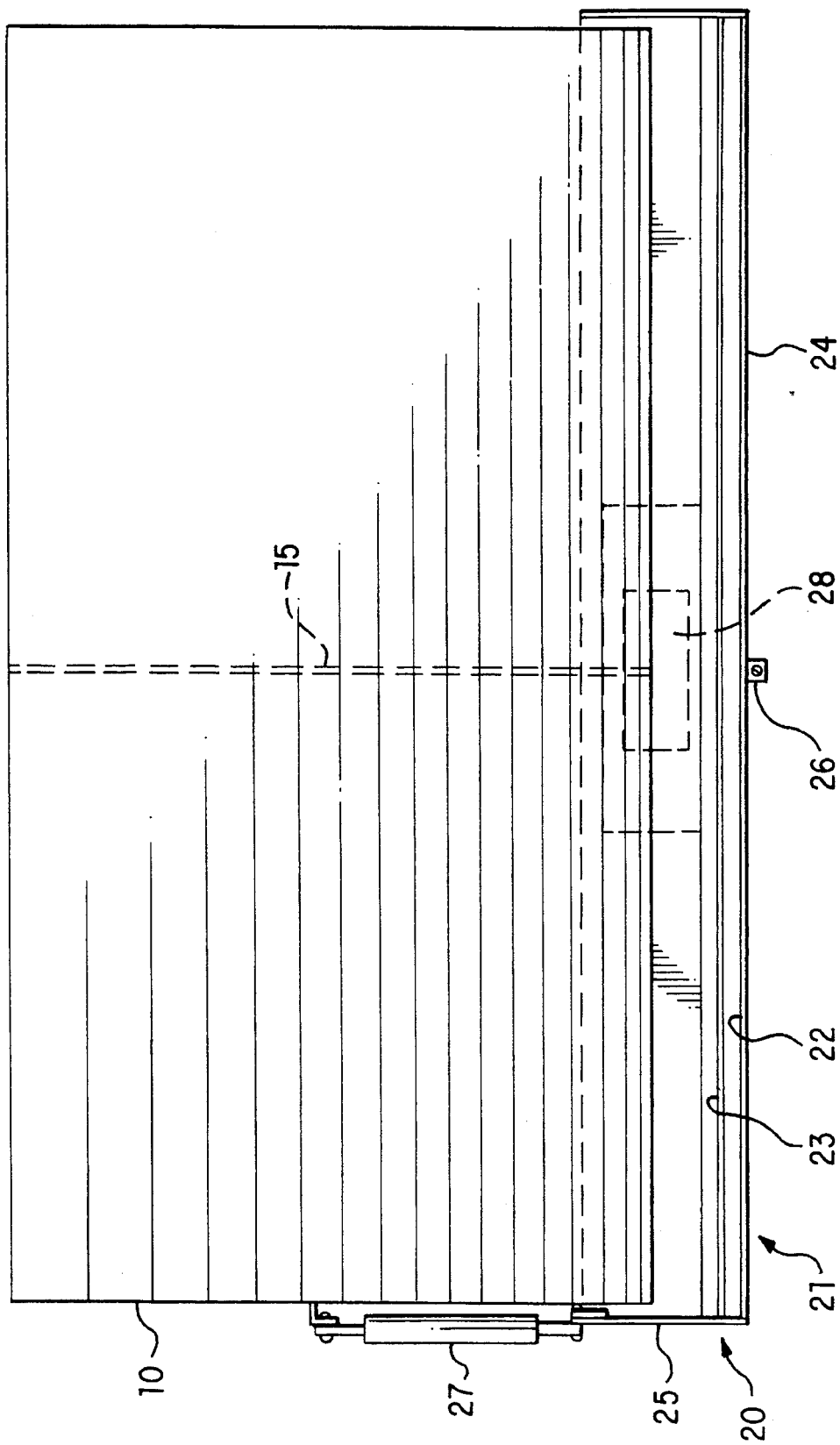

CULLET FEEDER

BACKGROUND OF THE INVENTION

1. Field of the Invention

This invention relates to feeding recycled glass, known as cullet, to a glass melting furnace using an adjustable vibrating plate cullet feeder for charging cullet. The cullet feeder of this invention provides independent control of the rate of cullet feed by adjustment of at least one of: the angle of the feeder plate, the intensity of vibration, and the frequency of vibration. The cullet feeder may be adjusted to feed over an existing batch charger or directly into the furnace and controlled by the batch charger or a furnace level or composition controller.

2. Description of Related Art

A number of reciprocating blanket batch chargers are known for feeding glass batch into a melting furnace: U.S. Pat. No. 3,780,889 teaches a reciprocating charger plate which may have its slope changed and may rotate about a vertical axis; U.S. Pat. No. 5,073,183 teaches a hydraulically operated reciprocating batch charger with an adjustable batch gate; U.S. Pat. No. 4,983,206 teaches a reciprocating batch charger with angular adjustment of the plate by jacking the roller assembly; U.S. Pat. No. 5,134,627 teaches a reciprocating batch charger with a pusher bar; U.S. Pat. No. 4,854,959 teaches a reciprocating batch charger with a pusher having a heat seal around the pusher holder and charger; U.S. Pat. No. 4,545,717 teaches a reciprocating batch charger with a movable scraper to seal the slot between the rear wall of the hopper and the charger plate; U.S. Pat. No. 4,226,564 teaches a reciprocating batch charger with a sealing case; U.S. Pat. No. 4,197,109 teaches a reciprocating batch feeder having an enclosure for the feeder and doghouse area.

U.S. Pat. No. 5,158,412 teaches a reciprocating solids charger in which a plurality of jacks adjust the front and rear of a charger plate support upon which the reciprocating drive is fixedly mounted.

U.S. Pat. No. 4,047,920 teaches a batch or cullet feeder which passes the material directly to the top of the melt and distributes the material over the melt surface by rotating pushers. U.S. Pat. No. 5,123,942 teaches a reciprocating batch/cullet charger in which a cullet hopper directly deposits a layer of preheated cullet over a layer of batch on a reciprocating charger plate, the height of the cullet charge being controlled by a gate plate.

Recycling of glass has become important in recent years in the conservation of natural resources and energy. Use of recycled glass, cullet, in high ratios, of 80 weight percent and more, to batch materials has become common in the glass industry, particularly for glass containers. Use of cullet, having different particle size and density as well as different melting characteristics than batch, presents problems requiring careful control of feed of the cullet to the melter for high efficiency results. It is desired to control feed of the cullet separately from the batch and to be able to feed solely cullet to the melter.

SUMMARY OF THE INVENTION

The apparatus and process of this invention provide independently controlled feeding of cullet from a storage hopper to a melting furnace by an adjustable, wide, vibrating feeder plate beneath a cullet hopper. The vibrating plate extends across a substantial portion of the width of the open charging area of the melting furnace, generally, more than about 5 feet and up to about 15 feet and more in present day furnaces. The feeding rate of the cullet to the furnace is controlled by adjustment of the angle of the vibrating plate and by adjustment of the intensity and/or frequency of the vibrations. The vibrating plate cullet feeder of this invention may be installed over any pre-existing or new installation batch feeder to provide independently controlled feeding of cullet over batch on a batch feeder plate for mixed cullet and batch feed to a melter. The vibrating plate cullet feeder of this invention may also be installed independently from any other feeder for direct cullet feed to a melting furnace.

BRIEF DESCRIPTION OF THE DRAWINGS

The above and further objects and advantages of this invention will become apparent upon reading the description of preferred embodiments and reference to the drawings wherein:

FIG. 2 is a simplified front view of a cullet feeder as shown in FIG. 1.

DESCRIPTION OF PREFERRED EMBODIMENTS

Figure 1:
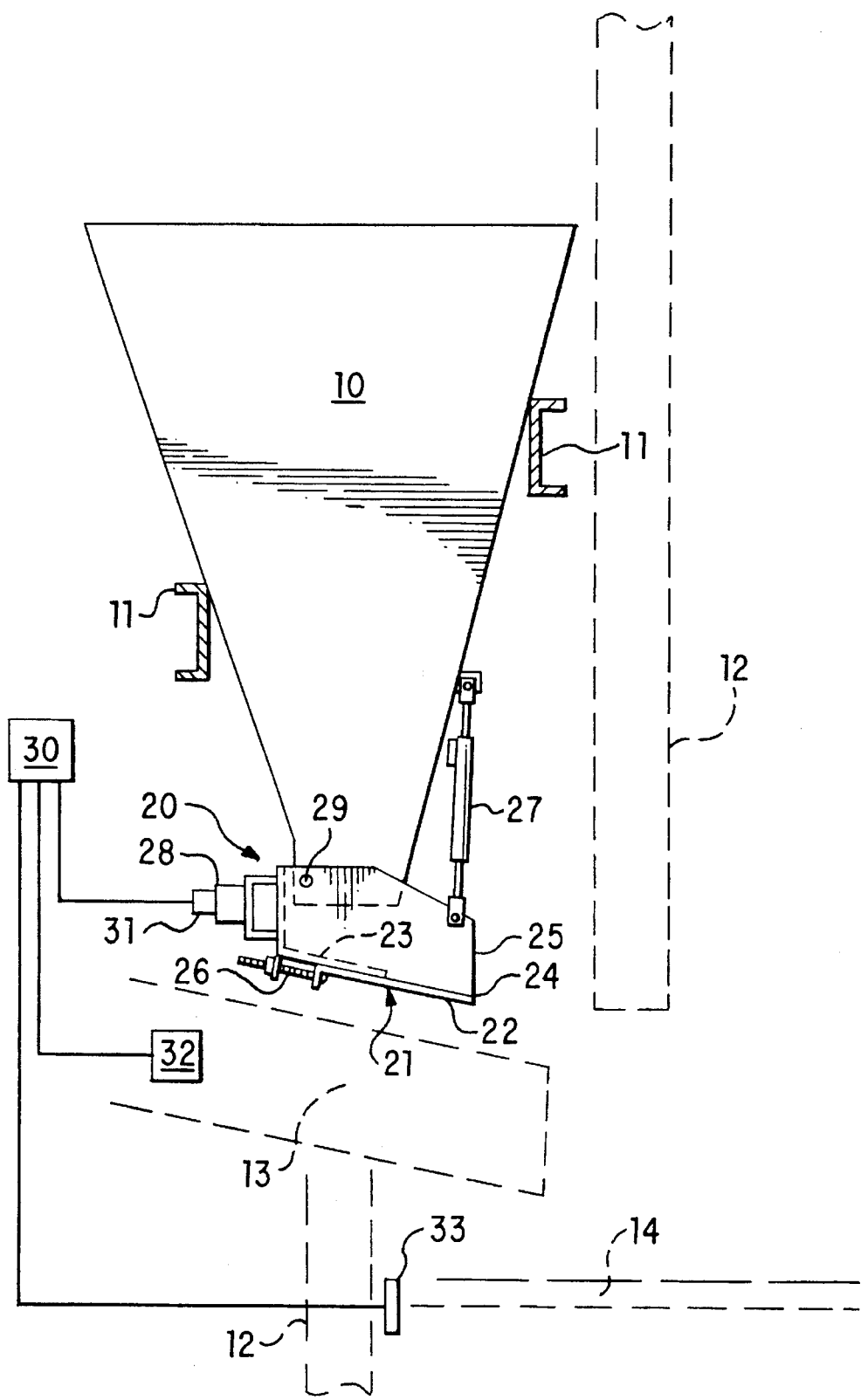
FIG. 1 is a simplified end view of a cullet feeder according to one embodiment of this invention.

Reciprocating batch charger plates, as taught in the above related art, are well known and have been satisfactory for feeding batch to melting furnaces. In reciprocating batch chargers, the batch charger plate is reciprocated backwards and forwards in the order of about 5 to about 8 inches at a frequency of about 1 to about 4 strokes per minute in typical applications. This has not been satisfactory for feeding cullet, since cullet is in a different physical condition than batch, such as, different size particles, different density, and different texture of mixture. The cullet feeder plate of the present invention is subjected to a vibratory movement, as opposed to the reciprocating movement of the known batch feeder plates. The vibratory movement, as used in this invention, is much more rapid, lesser distance movement and may be applied at any angle to the plane of the cullet feeder plate, as compared to the slow, reciprocating motion of batch feeders. Electric vibrators causing vibratory action are known to the art and any such suitable vibrator may be used.

The cullet feeder for feeding cullet from a storage hopper to a glass melting furnace has a generally rectangular wide cullet feeder plate beneath the storage hopper to receive cullet near its rear edge. The cullet feeder plate extends across a substantial portion of the width of the open charging area of the melting furnace or across a substantial portion of the width of a batch feeder plate when the cullet feeder is used in combination with a batch feeder. These widths are generally more than about 5 feet and up to about 15 feet and more in present day melting furnaces. The cullet moves from near the rear edge of the cullet feeder plate to the front edge over which it is discharged, controlled by the angle of the cullet feeder plate and the vibratory action of the cullet feeder plate, both with respect to intensity and frequency of vibration. Suitable intensities of vibration are greater than about 750 pounds, about 750 to about 2,000 pounds being most desired. Suitable frequencies of vibration are greater than about 2,500 vibrations per minute, about 2,500 to about 25,000 vibrations per minute being workable and about 2,500 to about 10,000 vibrations per minute being most desired. The cullet feeder plate is preferably fabricated from a wear resistant material and may be made in two portions, a rear plate portion and a front plate portion, the front plate portion, forming the front edge is adjustable to afford flexibility in adapting to operation requirements and to be readily replaceable when required due to wear.

Any suitable hopper, plurality of hoppers, or partitioned hopper which feeds cullet along the width of the cullet feeder plate by any feeder means known to the art may be used. Cullet supplied to the cullet hopper may be previously sized and pretreated by any means known to the art for recycling glass and may be further pretreated in the cullet hopper by any desired pretreatment process known to the art. The cullet hopper may be mounted on a support frame of its own or may be mounted on the frame of a batch charger. Such frames are desirably mounted on wheels so as to enable the entire charging apparatus to be rolled away from the furnace for easy servicing and repair.

The cullet feeder plate may be mounted to the support frame or may be mounted to the cullet hopper in a manner to allow the desired vibration and adjustment. The cullet feeder plate is mounted in a manner to allow angular adjustment of the plate to raise and lower its front edge relative to its rear edge. For this angular adjustment, it is desired that the angular pivot axis be toward the rear of the plate. One convenient means for adjustment of the angle of the cullet feeder plate is to provide jacking means pivotally mounted at one end to the cullet storage hopper or to the support frame and pivotally mounted at the opposite end to a front portion of the cullet feeder plate. The cullet feeder plate may be pivotally mounted to the cullet hopper or the support frame by any suitable means known to the art. The pivotal mounting be vertically adjustable so as to permit height adjustment of the cullet feeder plate.

The angular adjustment means, the vibrating adjustment means and operation of the vibrating means may be controlled manually, but are preferably controlled by a suitable electronic control means as known to the art for such control. The control means may be activated by a furnace level controller or by properties of the melt when the cullet feeder charges directly into the melting furnace. The control means may also be activated by operation of a batch charger or by properties of the melt when the cullet feeder charges cullet over batch on a batch charger plate for charging into the melting furnace.

In one preferred embodiment, the vibrating feeder plate cullet feeder of this invention is used in combination with a batch feeder of the type having a reciprocating batch feeder plate by positioning the front edge of the cullet feeder plate over a batch feeder plate in a location wherein the batch has been deposited on the batch feeder plate so that the cullet is deposited on top of the batch for substantially the width of the batch feeder plate. In this embodiment, the batch with the overlying cullet is fed to the melting furnace from the batch feeder plate. However, as opposed to prior methods of feeding batch with overlying cullet, the apparatus and process of this invention provides independent, rapid and broad control of the feed rate of the cullet, as compared with prior used feed gates. Control of the cullet feed so that it is on top of the batch in the melter, as provided by the cullet feeder of this invention, aids the melt rate.

In another preferred embodiment, the front edge of the cullet feeder plate may be positioned over the melt and the cullet discharged on top of the melt or batch independently from any batch feeder.

Referring to FIGS. 1 and 2, cullet feeder 20 feeds cullet from cullet storage hopper 10 mounted on framework 11 to a glass melting furnace, shown by walls 12, holding melt 14. In the embodiment shown in FIG. 1, cullet feeder 20 is mounted so as to discharge cullet over batch on batch charger plate 13 and batch with overlying cullet is fed through an open charging area to the top of melt 14. Generally rectangular wide cullet feeder plate 21 receives cullet from storage hopper 10 near its rear edge and discharges cullet over its opposite front edge 24. Cullet feeder plate 21 has end and rear upstanding portions 25 to prevent cullet from discharge in these regions. Cullet feeder plate 21, as shown in FIG. 1, has rear plate portion 23 and overlapping front plate portion 22 with adjustment means 26 so that front plate portion 22 may be advanced or retracted as desired for operating conditions. Front plate portion 22 may also be readily replaced when so worn as to not permit such compensation. Jacking means 27 is pivotally mounted at one end to storage hopper 10 and pivotally mounted at the opposite end to a front portion of cullet feeder plate 21 to provide angular adjustment of cullet feeder plate 21 about axis 29 mounting cullet feeder plate 21 to cullet hopper 10. Such angular adjustment lowers and raises the front edge of the plate relative to the rear edge to allow adjustment of the plate from positions about horizontal to about 45 degrees downward sloping toward the forward edge. For wide cullet feeder plates, it may be desirable to provide a jacking means 27 at each end of the cullet feeder plate. Vibrating means 28 is mounted to provide vibratory action to cullet feeder plate 21 at an adjustable intensity and frequency determined by operation conditions. The height of cullet feeder plate 21 is independently adjustable by location of the cullet feeder on its supporting frame or may be adjusted by adjustably mounting pivot 29 so as to enable vertical adjustment. The height adjustment of the cullet feeder plate may be accomplished by any means known to the art.

Cullet feeder control means 30 activates angular adjustment jacking means 27 and vibrating means 28 upon signal from batch charger control means 32 and/or furnace level and/or composition detector means 33. Cullet feeder control means 30 may also activate vibrating adjustment means 31 to provide adjustment of intensity and frequency of vibrations imparted by vibrating means 28 to cullet feeder plate 21. Activation means capable of activating operation of the control means and operation of the vibrating means by one of operation of the batch charger plate below the cullet feeder plate and a furnace level and/or composition detector may be used. Suitable control means to accomplish the above described functions are well known in the art, and any such suitable combination of such means may be used.

FIG. 2 shows the cullet feeder of FIG. 1 in a simplified front view showing, additionally, cullet storage hopper partition 15 which may be placed as desired to aid in providing an even amount of cullet feed across the width of cullet feeder plate 20.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A cullet feeder in combination with a batch feeder for feeding cullet from a storage hopper to a glass melting furnace comprising: a generally rectangular wide cullet feeder plate beneath said storage hopper to receive said cullet near its rear edge and to discharge said cullet over its opposite front edge; angular adjustment means for adjusting the angle of said cullet feeder plate to lower and raise said front edge relative to said rear edge; vibrating means for vibrating said cullet feeder plate at a determined intensity and frequency; and vibrating adjustment means for adjustment of at least one of said intensity and said frequency of said vibrations, the adjustable angle and said intensity and frequency of said vibrations of said cullet feeder plate controlling the discharge rate of said cullet, said cullet feeder in combination with said batch feeder having a batch feeder plate and positioned with said front edge of said cullet feeder plate over said batch feeder plate in a location wherein during operation said batch has already been deposited on said batch feeder plate, said cullet feeder plate being substantially the width of said batch feeder plate.

2. In a cullet feeder according to claim 1 wherein said improvement additionally comprises height adjustment means for adjusting the height of said cullet feeder plate.

3. In a cullet feeder according to claim 1 additionally comprising control means for controlling said angular adjustment means and said vibrating adjustment means.

4. In a cullet feeder according to claim 3 additionally comprising activation means for activating said control means and operation of said vibrating means by receipt of a signal caused by operation of one of: said batch feeder plate below said cullet feeder plate, a melt level detector, or a melt composition detector.

5. In a cullet feeder according to claim 1 wherein said cullet feeder plate comprises a rear plate portion and an overlapping adjustable front plate portion, said adjustable front plate portion forming said front edge which may be advanced or retracted to adjust for operation conditions.

6. In a cullet feeder according to claim 1 wherein said angular adjustment means comprises jacking means pivotally mounted at one end to said storage hopper and pivotally mounted at the opposite end to a front portion of said cullet feeder plate.

7. In a cullet feeder according to claim 1 wherein said cullet feeder plate, is about 5 to about 15 feet wide.

8. In a cullet feeder according to claim 1 wherein said intensity is greater than about 750 pounds.

9. In a cullet feeder according to claim 1 wherein said intensity is about 750 to about 2,000 pounds.

10. In a cullet feeder according to claim 1 wherein said frequency is greater than about 2,500 vibrations per minute.

11. In a cullet feeder according to claim 1 wherein said frequency is about 2,500 to about 25,000 vibrations per minute.

12. In a cullet feeder according to claim 1 wherein said frequency is about 2,500 to about 10,000 vibrations per minute.

13. A cullet feeder in combination with a batch feeder for feeding cullet from a storage hopper to a glass melting furnace comprising: a generally rectangular wide cullet feeder plate positioned beneath said storage hopper to receive said cullet near its rear edge and to discharge said cullet over its opposite front edge; a batch feeder plate disposed beneath said cullet feeder plate, said cullet feeder plate extending across a substantial portion of the width of said batch feeder plate: angular adjustment means for adjusting the angle of said cullet feeder plate to lower and raise said front edge relative to said rear edge; vibrating means for vibrating said cullet feeder plate at an intensity greater than about 750 pounds and a frequency greater than about 2,500 vibrations per minute; vibrating adjustment memos for adjustment of at least one of said intensity and said frequency of said vibrations, the adjustable angle and said intensity and frequency of vibrations controlling the discharge rate of said cullet; control means for controlling said angular adjustment means and said vibrating adjustment means; and activation means for activating said control means and operation of said vibrating means by receipt of a signal caused by operation of one of: operation of said batch feeder plate below said cullet feeder plate, a melt level detector, or a melt composition detector.

14. A cullet feeder according to claim 13 wherein said intensity is about 750 to about 2,000 pounds.

15. A cullet feeder according to claim 14 wherein said frequency is about 2,500 to about 10,000 vibrations per minute.

16. A cullet feeder according to claim 15 wherein said angular adjustment means comprises jacking means pivotally mounted at one end to said storage hopper and pivotally mounted at the opposite end to a front portion of said cullet feeder plate.

* * * * *